3,408,343
CLEAVAGE OF N-(CYCLOALK-2-EN-1-ONE-3-YL) PROTECTIVE GROUPS WITH NITROSYL CHLORIDE
Berthold Halpern, Menlo Park, Calif., assignor to Syntex Corporation, Panama, Panama, a corporation of Panama
No Drawing. Filed July 12, 1965, Ser. No. 471,416
Claims priority, application Mexico, July 21, 1964, 78,161
11 Claims. (Cl. 260—112.5)

ABSTRACT OF THE DISCLOSURE

N-(cycloalk-2-en-1-one-3-yl) groups, e.g., the dimedonyl group, may be used to protect amino groups during peptide synthesis. Following the synthesis of the desired peptide, the instant protective groups may be removed by treatment with nitrosyl chloride as well as by bromine. Also disclosed are N-(cycloalk-2-en-1-one-3-yl) derivatives of many amino acids.

The present invention relates to a novel process for the preparation of peptides.
process for hydrolyzing N-(cycloalk-2-en-1-one-3-yl)
More particularly the present invention relates to a groups present in substituted peptides.

In general, the peptides are of great importance for the role they play in the vital processes, for example, they are the basic components of the proteins, both in animals and vegetables, or exist in free form distributed widely in tissues, such as, for example, the glutathione. Furthermore, some of them have antibiotic properties, for example, gramicidan S, others have hormonal properties, such as, oxytocin that regulates the uterine contraction and lactation, or the adrenocorticotropic hormone which is the hormone of the anterior pituitary gland and is a peptide containing 39 amino acids, or the glucagon which is a pancreatic hormone with a chain of 29 amino acids, etc., and others are compounds of very important pharmacological properties such as insulin, which is of great utility in the treatment of diabetes, etc. The synthetic preparation of these peptides of known constitution is of great importance. On the other hand, the synthetic preparation of other peptides for experimental purposes, such as, for example, for metabolism studies, etc., is also of great interest. One of the major problems for syntheses of this type, rests on protecting the amino group of the primary or basic amino acid of the synthesis, in such a manner that the protecting group may be hydrolyzed later without simultaneously hydrolysing the peptide bonds, in other words, the bonds that join the amino acids together.

B. Halpern and L. P. James, Nature 202, 592 (1964) disclose a method for protecting the amino group of esters of aminoacids by condensation of these compounds with 5,5-dimethylcyclohexane-1,3-dione. In my copending application Ser. No. 468,136, filed June 29, 1965, and now abandoned there is disclosed a method for protecting the amino-groups of free amino acids and peptides by means of substitution of the same by an N-(cycloalk-2-en-1-one-3-yl) group. This grouping, present either in esters of amino acids, free amino acids or peptides already formed, resists the conventional condensation conditions employed in forming peptide chains from amino acids as well as to increase the length of the chain of a peptide already formed. However, there is the problem of the hydrolysis of this protecting grouping once the synthesis of the chain of the desired peptide is completed. In the same publication hereinabove mentioned, there is disclosed a procedure for hydrolyzing N-(5,5-dimethylcyclohex-2-en-1-one-3-yl) groups which comprises treating the N-protected peptide with approximately 1 molar equivalent of bromine, to thus obtain the peptide with a free amino group. However, this method has the disadvantage that it cannot be used for peptides containing amino acids such as tyrosine without causing attack of the same by bromine. In accordance with the present invention, the surprising discovery has been made of a general method which may be used for hydrolyzing the protecting N-(cycloalk-2-en-1-one-3-yl) groups without attacking the residue of the aforesaid amino acids or of any other amino acid.

In accordance with the process of the present invention, a (mono or poly)-N-(cycloalk-2-en-1-one-3-yl) peptide is treated with at least the number of molar equivalents of nitrosyl chloride equal to the number of N-(cycloalk-2-en-1-one-3-yl) groups present in the molecule of the starting compound, in a suitable solvent, such as a lower aromatic homocyclic hydrocarbon solvent, such as, for example, benzene, toluene, xylene, etc., a chlorinated lower hydrocarbon such as chloroform, methylene chloride, ethylene chloride, a teritary aromatic amine such as a pyridine, collidine, etc., a lower hydrocarbon or cyclic ether, such as diethyl ether, tetrahydrofuran, dioxane, etc., a lower alkylamide of a lower hydrocarbon carboxylic acid, such as dimethylformamide, dimethylacetamide, etc., a lower alkanol, for example, methanol, ethanol, propanol, etc., mixtures of these solvents, or similar solvents, preferably under anhydrous conditions, and then subsequently with a number of molar equivalents of water and a number of molar equivalents of acid not less, in each case, to the number of N-(cycloalk-2-en-1-one-3-yl) groups present in the starting peptide, to give the corresponding peptide with free amino groups.

The nitrosyl chloride reacts with the protecting groups during the first reaction step to produce the (mono or poly)-N-(2-isonitrosocycloalkan-1-one-3-ylidene) peptide and one molar equivalent of hydrogen chloride.

When the first step of the reaction is carried out in a nonbasic solvent, such as an aromatic hydrocarbon solvent, an alkanol, a hydrocarbon ether, a chlorinated hydrocarbon, etc., it is sufficient to add the necessary amount of water so that the hydrolysis is carried out by the action of the mol of hydrochloric acid obtained in the first step of the reaction. When the primary reaction is carried out in a basic solvent, such as a tertiary amine or an alkylamide, the hydrochloric acid formed in the first step reacts with the basic solvent without hydrolyzing the N - (2-isonitroso-cycloalkan-1-one-3-ylidenic) compound; therefore, a further treatment with acid and water is necessary. This treatment may be carried out either by isolating the product or transferring it to a neutral medium and treating any of them with the necessary amounts of acid and water or neutralizing the basic medium and then adding the necessary quantity of acid and water to effect the hydrolysis.

The above described methods of hydrolysis are solely illustrative and have no critical importance; therefore, other conventional methods for hydrolysis may be applied.

The first step of the reaction, that is, the treatment with a stream of nitrosyl chloride is generally carried out at a temperature which may vary between approximately −20° C. and the room temperature, and at a pressure close to the atmospheric pressure. Since the nitrosyl chloride is in gaseous form under these conditions, the reaction time will be such that at least the molar equivalents of nitrosyl chloride necessary for each N-(cycloalk-2-en-1-one-3-yl) group present in the molecule of the starting compound, is introduced into the reaction medium.

Since the exact determination of the gas flow is difficult, an excess of nitrosyl chloride is preferred to be introduced and is generally achieved in a period of time ranging from about 3 minutes to about 1 hour.

The acid hydrolysis of the resulting product of the first step is readily obtained and it is generally effected at about room temperature for a period of time which may fluctuate between approximately 5 minutes and one hour.

When the addition of an acid is necessary to effect the hydrolysis, it may be carried out with a relatively weak acid, such as, acetic acid, or preferably with stronger acids, either organic or mineral acids, such as hydrochloric, sulfuric, trichloroacetic, p-toluenesulfonic, and the like.

Where the solvent used for the acid hydrolysis is required to be different from that used in the first step of the process, there may be used any of the non-basic solvents described hereinabove.

The carboxyl groups of the starting compound may be found in the free or esterified form or in the form of conventional derivatives of the same.

It is preferable to have the amino groups protected in a suitable form, so that they are not attacked by the nitrosyl chloride.

The isolation of the final compound has no critical importance and may be effected by the conventional procedures for isolation of peptides known to those skilled in the art, and may be either in the form of their salts such as the hydrochloride, hydrobromide, etc., or in the free form.

The protecting group N-(cycloalk-2-en-1-one-3-yl) may preferably be an N-(cyclohex-2-en-1-one-3-yl) or N-(cyclopent-2-en-1-one-3-yl) group, which may contain various substituents, such as lower alkyl groups, for example, methyl, ethyl, propyl, isopropyl, cyclohexyl, etc., aryl groups, such as phenyl, lower aralkyl groups, such as benzyl, lower alkoxy groups such as ethoxy, methoxy, etc., halogens, preferably having an atomic weight higher than 19 orthophenylene groups, etc. Examples of the groups N-(cycloalk-2-en-1-one-3-yl) of great utility are the following: N-(cyclohex-2-en-1-one-3-yl), N - (5,5-dimethylcyclohex-2-en-1-one-3-yl), N-(5,5-diethylcyclohex-2-en-1-one-3-yl), N-(cyclopent-2-en-1-one-3-yl), N-(4,4-dimethylcyclopent-2-en-1-one-3-yl), N-(ind-2-en-1-one-3-yl), N-(4-propylcyclopent-2-en-1-one-3-yl), etc.

The above mentioned protecting group, is generally introduced at the beginning of the synthesis of the desired peptide, in order to protect the amino group or groups of the primary or basic amino acid of the chain; it may also be introduced in an amino acid which comes later in the chain when it has more than two amino groups, for example, lysine, hydroxylsine, etc. N-(cycloalk-2-en-1-one-3-yl) amino acids can enter in the synthesis of peptides in free form or in the form or esters. These protected esters may be obtained by reaction of the free amino group of the same with a 1,3-cycloalkanedione. The free N-protected acids are obtained by hydrogenation of the N-(protected)-benzyl esters, as described in my copending application Ser. No. 468,135 filed June 29, 1965, and now abandoned.

The 1,3-cycloalkanedione may be preferably a 1,3-cyclopentanedione or a 1,3-cyclohexanedione, either free or substituted. Examples of suitable 1,3-cycloalkanediones are:

cyclohexane-1,3-dione,
4,5-diphenylcyclohexane-1,3-dione,
5,5-dimethyl-4-phenylcyclohexane-1,3-dione,
5,5-diethylcyclohexane-1,3-dione,
5-benzylcyclohexane-1,3-dione,
5,5-dimethylcyclohexane-1,3-dione,
4-benzylcyclohexane-1,3-dione,
4-ethylcyclohexane-1,3-dione,
4-propylcyclohexane-1,3-dione,
5-isohexyl-5-methylcyclohexane-1,3-dione,
4-isopropylcyclohexane-1,3-dione,
5-isopropylcyclohexane-1,3-dione,
5-propylcyclohexane-1,3-dione,
5-phenylcyclohexane-1,3-dione,
4,5,5-trimethylcyclohexane-1,3-dione,
4,6,6-trimethylcyclohexane-1,3-dione,
4-amylcyclohexane-1,3-dione,
5-amylcyclohexane-1,3-dione,
4,6-dibromo-5,5-dimethylcyclohexane-1,3-dione,
4-ethoxy-5,5-dimethylcyclohexane-1,3-dione,
5-p-hydroxyphenylcyclohexane-1,3-dione,
4-cyclohexylcyclohexane-1,3-dione,
4,5-diphenylcyclohexane-1,3-dione,
cyclopentane-1,3-dione,
4-propylcyclopentane-1,3-dione,
4,4-dimethylcyclopentane-1,3-dione,
4,5-diphenylcyclopentane-1,3-dione,
4-hydroxycyclopentane-1,3-dione,
indane-1,3-dione,
4-hydroxy-6-methoxyindane-1,3-dione,
4-hydroxy-7-methylindane-1,3-dione, etc.

The condensation reactions used for the synthesis of peptides from N-(cycloalk-2-en-1-one-3-ylic) amino acids are the conventional ones.

Even though the process of hydrolysis of a N-(cycloalk-2-en-1-one-3-yl) peptide to give the peptide with the free amino group may be applied to any kind of peptides, it has special importance when effected on peptides derived from α-amino acids, resulting from the hydrolysis of natural proteins, or from stereoisomeric α-amino acids of the same, such as: glycine, alanine, valine, leucine, isoleucine, serine, threonine, cysteine, cystine, methionine, phenylalanine, tyrosine, halogenated tyrosine, tryptophan, lysine, hydroxylysine, arginine, histidine, aspartic acid, glutamic acid, proline, and hydroxyproline, especially when they are formed by chains of 2 to 15 of said amino acids, which are generally the peptides that serve as basis for the synthesis of proteins of greater size or of peptides of longer chain.

The following specific examples serve to illustrate but are not intended to limit the scope of the present invention.

EXAMPLE I

One gram of the hydrobromide of the benzyl ester of glycine was added to a solution of a molar equivalent of dimedone (5,5-dimethylcyclohexane-1,3-dione) in 20 cc. of chloroform, and the resulting suspension was neutralized with 1 molar equivalent of anhydrous triethylamine. The resulting clear solution was allowed to stand at room temperature overnight. It was then evaporated to dryness and the residue triturated with hot benzene. After filtration, the benzenic solution was chromatographed on alumina. By elution with chloroform there was obtained a yellowish oil that was crystallized from benzene to give the N - (5,5 - dimethylcyclohex - 2 - en - 1 - one - 3 - yl) glycine benzyl ester (Cpd. No. 1).

EXAMPLE II

A suspension of 0.5 g. of a 5% palladium on carbon catalyst in 50 cc. of methanol was hydrogenated for 30 minutes. A solution of 2 g. of the N-(5,5-dimethylcyclohex-2-en-1-one-3-yl) glycine benzyl ester (Cpd. No. 1) in 200 cc. of methanol was added to the catalyst and the mixture was stirred under an atmosphere of hydrogen until one molar equivalent of this gas was absorbed. After elimination of the catalyst by filtration, the solution was evaporated and the crude residue was purified by crystallization from water, thus giving the N-(5,5-dimethylcyclohex-2-en-1-one-3-yl) glycine (Cpd. No. 2).

EXAMPLE III

The starting compounds listed under I were treated in accordance with Example I, but using the diketone indicated under II, to give the corresponding N-derivative, which was treated following the procedure described in Example II, to afford finally the product described under III:

| I | II | Cpd. | III |
|---|---|---|---|
| Hydrobromide of DL-alanine benzyl ester. | 5,5-dimethylcyclohexane-1,3-dione. | 3 | N-(5,5-dimethylcyclohex-2-en-1-one-3-yl)-DL-alanine. |
| Do. | 4,5-diphenylcyclohexane-1,3-dione. | 4 | N-(4,5-diphenylcyclohex-2-en-1-one-3-yl)-DL-alanine. |
| Do. | Cyclohexane-1,3-dione. | 5 | N-(cyclohex-2-en-1-one-3-yl)-DL-alanine. |
| Hydrobromide of glycine benzyl ester. | 5,5-diethylcyclohexane-1,3-dione. | 6 | N-(5,5-diethylcyclohex-2-en-1-one-3-yl)-glycine. |
| Do. | Cyclopentane-1,3-dione. | 7 | N-(cyclopent-2-en-1-one-3-yl)-glycine. |
| Hydrobromide of L-aspartic acid dibenzyl ester. | 5,5-dimethylcyclohexane-1,3-dione. | 8 | N-(5,5-dimethylcyclohex-2-en-1 one-3-yl)-L-aspartic acid. |
| Do. | 5,5-diethylcyclohexane-1,3-dione. | 9 | N-(5,5-diethylcyclohex-2-en-1-one-3-yl)-L-aspartic acid. |
| Do. | 4-benzylcyclohexane-1,3-dione. | 10 | N-(4-benzylcyclohex-2-en-1-one-3-yl)-L-aspartic acid. |
| Hydrobromide of L-glutamic acid dibenzyl ester. | 4-phenyl-5,5-dimethylcyclohexane-1,3-dione. | 11 | N-(4-phenyl-5,5-dimethylcyclohex-2-en-1-one-3-yl)-L-glutamic acid. |
| Do. | 5-propylcyclohexane-1,3-dione. | 12 | N-(5-propylcyclohex-2-en-1-one-3-yl)-L-glutamic acid. |
| Hydrobromide of DL-phenylalanine benzyl ester. | 5-phenylcyclohexane-1,3-dione. | 13 | N-(5-phenylcyclohex-2-en-1-one-3-yl)-DL-phenylalanine. |
| Do. | 4,5,5-trimethylcyclohexane-1,3-dione. | 14 | N-(4,5,5-trimethylcyclohex-2-en-1-one-3-yl)-DL-phenylalanine. |
| Hydrobromide of L-phenylalanine benzyl ester. | 5,5-dimethylcyclohexane-1,3-dione. | 15 | N-(5,5-dimethylcyclohex-2-en-1-one-3-yl)-L-phenylalanine. |
| Do. | 4-propylcyclopentane-1,3-dione. | 16 | N-(4-propylcyclopent-2-en-1-one-3-yl)-L-phenylalanine. |
| Hydrobromide of DL-valine benzyl ester. | 4,5-diphenylcyclopentane-1,3-dione. | 17 | N-(4,5-diphenylcyclopent-2-en-1-one-3-yl)-DL-valine. |
| Do. | 4-cyclohexylcyclohexane-1,3-dione. | 18 | N-(4-cyclohexylcyclohex-2-en-1-one-3-yl)-DL-valine. |
| Hydrochloride of D-alanine benzyl ester. | 5,5-dimethylcyclohexane-1,3-dione. | 19 | N-(5,5-dimethylcyclohex-2-en-1-one-3-yl)-D-alanine. |
| Do. | 4,4-dimethylcyclopentane-1,3-dione. | 20 | N-(4,4-dimethylcyclopent-2-en-1 one-3-yl)-D-alanine. |
| Do. | 5,5-dimethylcyclohexane-1,3-dione. | 21 | N-(5,5-dimethylcyclohex-2-en-1-one-3-yl)-L-alanine. |
| Do. | Indane-1,3-dione. | 22 | N-(ind-2-en-1-one-3-yl)-L-alanine. |
| Hydrochloride of L-cysteine benzyl ester. | Cyclopentane-1,3-dione. | 23 | N-(cyclopent-2-en-1-one-3-yl)-L-cysteine. |
| Hydrochloride of L-cysteine benzyldione ester. | Cyclohexane-1,3. | 24 | N-(cyclohex-2-en-1-one-3-yl)-L-cysteine. |
| hydrochloride of L-proline benzyl ester. | Indane-1,3-dione. | 25 | N-(ind-2-en-1-one-3-yl)-L-proline. |
| Hydrochloride of D-tyrosine benzyl ester. | 5,5-dimethylcyclohexane-1,3-dione. | 26 | N-(5,5-dimethylcyclohex-2-en-1-one-3-yl)-D-tyrosine. |
| Hydrochloride of L-tyrosine benzyl ester. | Cyclohexane-1,3-dione. | 27 | N-(cyclohex-2-en-1-one-3-yl)-L-tyrosine. |

EXAMPLE IV

To a mixture of 0.1 mol of N-(5,5-dimethylcyclohex-2-en-1-one-3-yl)-glycine and 0.1 mol of the hydrobromide of DL-alanienebenzyl ester and 100 cc. of pyridine there was added 0.1 mol of dicyclohexylcarbodiimide and the whole was allowed to stand at room temperature overnight. The resulting mixture was filtered, and the filtrate was adjusted to pH 6 by addition of aqueous hydrochloric acid at 0° C. and was extracted with chloroform. The extract was washed successively with water, 3% sodium carbonate solution and water, and finally it was dried over anhydrous sodium sulfate. The solution was concentrated to a small volume, diluted with petroleum ether and the precipitate was separated by filtration and recrystallized from ethanol, thus giving the benzyl ester of the N-(5,5-dimethylcyclohex-2-en-1-one-3-yl)-glycyl-DL-alanine (Cpd. No. 28).

This compound was treated in accordance with Example 2, thus affording the N-(5,5-dimethylcyclohex-2-en-1-one-3-yl)-glycyl-DL-alanine (Cpd. No. 29).

EXAMPLE V

A solution of 0.02 mol of N-(5,5-dimethylcyclohex-2-en-1-one-3-yl)-DL-alanine and 0.02 mol of triethylamine in 50 cc. of toluene was cooled to −5° C. and there was then added 0.02 mol of isobutyl chloroformate. After 25 minutes there was added a solution of 0.02 mol of the hydrochloride of DL-phenylalanine benzyl ester and 0.02 mol of triethylamine in 100 cc. of chloroform. The resulting mixture was vigorously stirred for 5 hours allowing the temperature of the reaction to reach the room temperature. It was then diluted with more chloroform and the mixture washed successively with water, 3% sodium carbonate solution and water, and finally dried over anhydrous sodium sulfate. The solution was concentrated to a small volume under reduced pressure and to the residue there was added petroleum ether, the precipitate was separated by filtration and crystallized from ethanol, thus giving the N-(5,5-dimethylcyclohex-2-en-1-one-3-yl)-DL-alanyl-DL-phenylalanine benzyl ester (Cpd. No. 30).

This compound was treated in accordance with Example No. II, thus giving the N-(5,5-dimethylcylohex-2-en-1-one-3-yl)-DL-alanyl-DL-phenylalanine (Cpd. No. 31).

EXAMPLE VI

The process described in Example IV was repeated except that there was used the hydrochloride of L-proline benzyl ester and thus there were successively obtained the N - (5,5-dimethylcyclohex-2-en-1-one-3-yl)-glycyl-L-proline benzyl ester (Cpd. No. 32) and the N-(5,5-dimethylcyclohex-2-en-1-one-3-yl)-glycl-L-proline (Cpd. No. 33).

EXAMPLE VII

The process described in Example IV was repeated but instead of using the hydrobromide of DL-alanine benzyl ester, there was used the hydrochloride of D-tyrosine benzyl ester, thus affording successively the N-(5,5-dimethylcyclohex-3-en-1-one-3-yl)-glycyl-D-tyrosine benzyl ester (Cpd. No. 34) and the N-(5,5-dimethylcyclohex-2-en-1-one-3-yl)-glycyl-D-tyrosine (Cpd. No. 35).

EXAMPLE VIII

To 14 cc. (0.1 mol) of diethyl phosphite there was added 0.02 mol of compound No. 33, 0.022 mol of triethylamine and 0.02 mol of the hydrochloride of L-tyrosine benzyl ester, the mixture was stirred and 0.022 mol of tetraethyl pyrophosphite was added and the whole was treated on the steam bath for 30 minutes. Lastly, 50 cc. of water were added and the reaction mixture was cooled in icewater, the precipitated product was separated and washed first with 20 cc. of a 5% sodium bicarbonate solution and later with water. The crude product was dried and recrystallized from ethyl acetate-petroleum ether, to give the N-(5,5-dimethylcylohex-2-en-1-one-3-yl)-glycyl-L-prolyl-L-tyrosine benzyl ester (Cpd. No. 36).

This last mentioned compound was hydrogenated in accordance with Example IV, to give the N-(5,5-dimethylcyclohex-2-en-1-one-3-yl) - glycyl - L - prolyl - L - tryosine (Cpd. No. 37).

EXAMPLE IX

The Compound No. 37 was treated in accordance with Example V, obtaining successively the N-(5,5-dimethyl-cyclohex - 2 - en - 1 - one - 3 - yl) - glycyl - L - prolyl - L-tyrosyl-DL-phenylalanine benzyl ester (Cpd. No. 38) and the N - (5,5-dimethylcyclohex-2-en-1-one-3-yl)-glycyl-L-prolyl-L-tyrosyl-DL-phenylalanine (Cpd. No. 39).

EXAMPLE X

Through a mixture of 1 g. of Compound No. 28 and 50 cc. of anhydrous ethanol, there was passed a stream of nitrogen for 2 minutes, at room temperature, followed successively of a stream of nitrosyl chloride for 10 min. and a stream of nitrogen for 3 minutes. To the resulting mixture there was added 10 cc. of a 2 N hydrochloric acid solution, the whole was concentrated to a small volume and cooled to 0° C. After half an hour the hydrochloride of glycyl-DL-alanine benzyl ester started to crystallize (Cpd. No. 40).

EXAMPLE XI

Through a solution of 2 g. of Compound No. 29 in 100 cc. of anhydrous pyridine maintained at 0° C., there were passed successively a stream of nitrogen for 5 min., a stream of nitrosyl chloride for 15 min. and a stream of nitrogen for 5 minutes further. The reaction mixture was evaporated to dryness, 30 cc. of a 2 N aqueous hydrochloric acid solution, were added; the mixture was allowed to react for 10 min. and the resulting mixture was extracted with benzene, the inorganic layer was passed through a column of Dowex 50, acid form. The column was eluted with pyridine-water, and the eluted solution was evaporated to dryness, thus obtaining glycyl-DL-alanine (Cpd. No. 41).

EXAMPLE XII

The Compounds Nos. 30, 32, 34, 36 and 38 were treated in accordance with Example X, affording respectively the following compounds: the hydrochloride of DL–alanyl–DL–phenylalanine benzyl ester (Cpd. No. 42), the hydrochloride of glycyl-L-proline benzyl ester (Cpd. No. 43), the hydrochloride of glycyl-D-tyrosine benzyl ester (Cpd. No. 44), the hydrochloride of glycyl-L-prolyl-L-tyrosine benzyl ester (Cpd. No. 45) and the hydrochloride of glycyl-L-prolyl-L-tyrosyl-DL-phenylalanine benzyl ester (Cpd. No. 46).

EXAMPLE XIII

The Compounds Nos. 31, 33, 35, 37 and 39 were treated in accordance with Example XI, producing respectively DL-alanyl-DL-phenylalanine (Cpd. No. 47), glycyl-L-proline (Cpd. No. 48), glycyl D-tyrosine (Cpd. No. 49), glycyl-L-prolyl-L-tyrosine (Cpd. No. 50) and glycyl-L-prolyl-L-tyrosyl-DL-phenylalanine (Cpd. No. 51).

EXAMPLE XIV

The Compounds Nos. 4 to 27, included, were treated in accordance with the process described in Example IV, thus obtaining successively the corresponding N-(cycloalk-2-en-1-one-3-yl)-α-aminoacyl-DL-alanines benzyl esters and the corresponding free N-(cycloalk-2-en-1-one-3-yl)-α-aminoacyl-DL-alanines.

The N - (cycloalk - 2 - en-1-one-3-yl)-α-aminoacyl-DL-alanines benzyl esters were treated in accordance with Example X, to give the corresponding hydrochlorides of α-aminoacyl-DL-alanines benzyl esters.

The N - (cycloalk - 2 - en-1-one-3-yl)-α-aminoacyl-DL-alanines were treated in accordance with Example XI, to give the corresponding free α-aminoacyl-DL-alanines.

EXAMPLE XV

The compounds Nos. 4 to 27, included, were treated in accordance with Example V, obtaining successively the corresponding N-(cycloalk-2-en-1-one-3-yl)-α-aminoacyl-DL-phenylalanines benzyl esters and the corresponding free N-(cycloalk - 2 - en - 1 - one-3-yl)-α-aminoacyl-DL-phenylalanines.

The N - (cycloalk - 2 - en-1-one-3-yl)-α-aminoacyl-DL-phenylalanines benzyl esters were treated in accordance with Example X, to produce the corresponding hydrochlorides of the α-aminoacyl-DL-phenylalanines benzyl esters.

The free N - (cycloalk - 2-en-1-one-3-yl)-α-aminoacyl-DL-phenyl alanines were treated in accordance with Example XI, thus producing the corresponding α-aminoacyl-DL-phenyl alanines.

EXAMPLE XVI

Through a solution of 1 g. of compound No. 28 in 100 cc. of anhydrous ethanol, maintained at −10° C., there was passed successively a stream of nitrogen for 2 minutes, a stream of nitrosyl chloride for 45 minutes and a stream of nitrogen for 3 minutes further. The reaction mixture was treated with one molar equivalent of water; it was then allowed to stand for 5 minutes and concentrated to a small volume. After cooling at 0° C. for 1 hour the hydrochloride of glycyl-DL-alanine benzyl ester (Cpd. No. 40) began to crystallize.

EXAMPLE XVII

The process described in Example XI was repeated, but instead of using pyridine there was used dimethylformamide, thus giving the same final product.

EXAMPLE XVIII

The process described in Example X was repeated, except that the solvent was formed by an anhydrous mixture of chloroform-benzene (1:1), thus giving the same final product.

EXAMPLE XIX

The process described in Example XI was again repeated, except that the acid hydrolysis was carried out using a molar equivalent of hydrochloric acid in 20 cc. of water. The same final product was obtained.

EXAMPLE XX

The process described in Example XI was again repeated, except that the acid hydrolysis was carried out using one molar equivalent of hydrochloric acid in one molar equivalent of water. The same final product was obtained.

EXAMPLE XXI

The process described in Example XI was again repeated, except that the acid hydrolysis was carried out using an equivalent amount of an aqueous 2 N hydrobromic acid solution. The same final product was obtained.

EXAMPLE XXII

Through a solution of 2 grams of N-(5,5-dimethylcyclohex-2-en-1-one-3-yl)glycine (Cpd. No. 2) in 100 cc. of anhydrous pyridine, maintained at 0° C., there were passed, successively, a stream of nitrogen for 5 minutes, a stream of nitrosyl chloride for 15 minutes and then a stream of nitrogen for 5 minutes. Next, the reaction mixture was evaporated to dryness, and 30 cc. of an aqueous 2 N hydrochloric acid solution was added to the residue. This mixture was allowed to react for 10 minutes, then extracted with benzene. The inorganic layer was admixed with 20 cc. of ethanol, and the resulting mixture was concentrated under reduced pressure. Finally, the residue was cooled to 0° C. and after one hour, the hydrobromide of glycyl-DL-alanine crystallized (Cpd. No. 52).

EXAMPLE XXIII

The process described in Example X was repeated, but instead of using anhydrous ethanol, there was used anhydrous dioxane, thus giving the same final result.

EXAMPLE XXIV

The process described in Example X was exactly followed, with the exception that anhydrous tetrahydrofuran was used instead of anhydrous ethanol, obtaining the same final product.

EXAMPLE XXV

The described process in Example X was repeated, except that the steam of nitrosyl chloride was controlled in such a manner, that only 1.1 molar equivalents of the same passed, thus giving the same final product.

EXAMPLE XXVI

The process described in Example X was repeated, except that the solvent was formed by a mixture of methylene chloride-toluene, thus affording the same final compound.

EXAMPLE XXVII

The process described in Example X was repeated, except that anhydrous methanol was used insetead of anhydrous ethanol, thus obtaining the same results.

I claim:

1. A process for hydrolyzing N-(cycloalk-2-en-1-one-3 yl) groups present in peptide chains, comprising reacting the starting N-(cycloalk-2-en-1-one-3-yl)peptide with at least the number of molar equivalents of nitrosyl chloride equal to the number of N-(cycloalk-2-en-1-one-3-yl) groups present in said N-(cycloalk-2-en-1-one-3-yl)peptide in an organic solvent, followed by treatment with aqueous acid, said N-(cycloalk-2-en-1-one-3-yl) group being selected from the group consisting of N-(cyclohex-2-en-1-one-3-yl),
N-(4,5-diphenylcyclohex-2-en-1-one-3-yl),
N-(5,5-dimethyl-4-phenylcyclohex-2-en-1-one-3-yl),
N-(5-5-diethylcyclohex-2-en-1-one-3-yl),
N-(5-benzylcyclohex-2-en-1-one-3-yl),
N-(5,5-dimethylcyclohex-2-en-1-one-3-yl),
N-(4-benzylcyclohex-2-en-1-one-3-yl),
N-(4-ethylcyclohex-2-en-1-one-3-yl),
N-(4-propylcyclohex-2-en-1-one-3-yl),
N-(5-isohexyl-5-methylcyclohex-2-en-1-one-3-yl),
N-(4-isopropylcyclohex-2-en-1-one-3-yl),
N-(5-isopropylcyclohex-2-en-1-one-3-yl),
N-(5-propylcyclohex-2-en-1-one-3-yl),
N-(5-phenylcyclohex-2-en-1-one-3-yl),
N-(4,5,5-trimethylcyclohex-2-en-1-one-3-yl),
N-(4,6,6-trimethylcyclohex-2-en-1-one-3-yl),
N-(4-amylcyclohex-2-en-1-one-3-yl),
N-(5-amylcyclohex-2-en-1-one-3-yl),
N-(4,6-dibromo-5,5-dimethylcyclohex-2-en-1-one-3-yl),
N-(4-ethoxy-5,5-dimethylcyclohex-2-en-1-one-3-yl),
N-(5-p-hydroxyphenylcyclohex-2-en-1-one-3-yl),
N-(4-cyclohexylcyclohex-2-en-1-one-3-yl),
N-(cyclopent-2-en-1-one-3-yl),
N-(4-propylcyclopent-2-en-1-one-3-yl),
N-(4,4-dimethylcyclopent-2-en-1-one-3-yl),
N-(4,5-diphenylcyclopent-2-en-1-one-3-yl),
N-(4-hydroxycyclopent-2-en-1-one-3-yl),
N-(ind-2-en-1-one-3-yl),
N-(4-hydroxy-6-methoxyind-2-en-1-one-3-yl), and
N-(4-hydroxy-7-methylind-2-en-1-one-3-yl)

and said reaction nitrosyl chloride is carried out at a temperature ringing between approximately —20° C. and room temperature.

2. The process of claim 1 wherein the reaction with nitrosyl chloride is carried out in one anhydrous non-basic organic solvent, and the acid hydrolysis is effected with the hydrochloric acid resulting from the first step of the reaction by addition of a number of molar equivalents of water not less than the number of N-(cycloalk-2-en-1-3-yl) groups present in the starting compound.

3. The process of claim 2 wherein the non basic solvent is selected from the group consisting of lower alkanols, chlorinated lower hydrocarbons and aromatic monocyclic hydrocarbons.

4. The process of claim 1 wherein the reaction with nitrosyl chloride is carried out in a basic organic solvent, and the resulting product is treated with a number of molar equivalents of water and a number of molar equivalents of acid not less than the number of N-(cycloalk-2-en-1-one-3-yl) groups present in the molecule of the starting compound.

5. The process of claim 4 wherein the basic solvent is selected from the group consisting of pyridine and methyl derivatives thereof and lower alkylamides of lower hydrocarbon carboxylic acids.

6. The process of claim 1 wherein the acid hydrolysis is carried out at about room temperature for a time ranging between approximately 5 minutes to 1 hour.

7. The process of claim 1 wherein the N-(cycloalk-2-en-1-one-3-yl) group is a N-(cyclohex-2-en-1-one-3-yl), group.

8. The process of claim 1 wherein the N-(cycloalk-2-en-1-one-3-yl) group is the N-(cyclopent-2-en-1-one-3-yl) group.

9. The process of claim 1 wherein the N-(cycloalk-2-en-1-one-3-yl) group is the N-(5,5-dimethylcyclohex-2-en-1-one-3-yl) group.

10. The process of claim 1 wherein the N-(cycloalk-2-en-1-one-3-yl) group is the N-(4-cyclohexylcyclohex-2-en-1-one-3-yl) group.

11. The process of claim 1 wherein the N-(cycloalk-2-en-1-one-3-yl) group is the N-(4-propylcyclopent-2-en-1-one-3-yl) group.

References Cited

UNITED STATES PATENTS

| | | | |
|---|---|---|---|
| 2,198,260 | 4/1940 | Melsen | 260—584 |
| 3,141,880 | 7/1964 | Martin | 260—247.7 |

OTHER REFERENCES

Halpern et al., Nature 202, 592–593 (1964).
Szmuszkovicz, Advances in Organic Chemistry, vol 4, Interscience Publishers, New York, 1963. p. 70.
Halpern et al., Aust. J. Chem. 17, 1282–1287 (1964).
Halpern et al., Chem. Ind. (London) 1965, 1183–1184.
Lynn et al., J. Am. Pharm. Assn. 15, 174–177 (1926).

LEWIS GOTTS, *Primary Examiner.*

M. M. KASSENOFF, *Assistant Examiner.*

UNITED STATES PATENT OFFICE
CERTIFICATE OF CORRECTION

Patent No. 3,408,343  
October 29, 1968

Berthold Halpern

It is certified that error appears in the above identified patent and that said Letters Patent are hereby corrected as shown below:

Column 1, line 26, cancel "process for hydrolyzing N-(cycloalk-2-en-1-one-3-yl)" and insert same after "a" in line 27, same column 1. Column 5, line 44, "alaienebenzyl" should read -- alaninebenzyl --. Column 9, line 14, "steam" should read -- stream --. Column 10, line 4, after "reaction" insert -- with --; line 8, "one" should read -- an --.

Signed and sealed this 3rd day of March 1970.

(SEAL)  
Attest:

Edward M. Fletcher, Jr.  
Attesting Officer

WILLIAM E. SCHUYLER, JR.  
Commissioner of Patents